United States Patent
Chen et al.

[19]

[11] Patent Number: 6,163,118
[45] Date of Patent: Dec. 19, 2000

[54] METHOD AND APPARATUS FOR CONTROLLING A MOTOR IN A MASS STORAGE DEVICE

[75] Inventors: Hao Chen, Plano; Gregory Swize, Dallas, both of Tex.; Bertram John White, Irvine, Calif.

[73] Assignee: Texas Instruments Incorporated, Dallas, Tex.

[21] Appl. No.: 09/197,243

[22] Filed: Nov. 20, 1998

[51] Int. Cl.[7] ................................................. H02K 23/00
[52] U.S. Cl. .......................... 318/254; 318/439; 318/608; 318/606
[58] Field of Search ................................... 318/254, 438, 318/139, 606–611, 599–601

[56]             References Cited

U.S. PATENT DOCUMENTS

| | | | |
|---|---|---|---|
| 5,294,877 | 3/1994 | Cameron .................................. | 318/809 |
| 5,451,832 | 9/1995 | Cameron et al. ....................... | 318/375 |
| 5,512,805 | 4/1996 | Rohrbaugh et al. .................... | 318/254 |
| 5,517,095 | 5/1996 | Carobolante et al. .................. | 318/254 |
| 5,572,097 | 11/1996 | Cameron ................................. | 318/254 |
| 5,798,623 | 8/1998 | El-Sadi ................................... | 318/254 |
| 5,821,717 | 10/1998 | Hassan et al. .......................... | 318/254 |
| 5,866,998 | 2/1999 | Menegoli ................................ | 318/254 |
| 5,949,203 | 9/1999 | Buthker .................................. | 318/254 |

*Primary Examiner*—David Martin
*Attorney, Agent, or Firm*—W. Daniel Swayze, Jr.; Wade James Brady, III; Frederick J. Telecky, Jr.

[57]             ABSTRACT

A method of detecting phase error between a phase current and a driving voltage includes generating a signal indicative of the phase current. The method includes identifying a time interval during which the signal indicative of the phase current is generally symmetric about a midpoint of the time interval when the phase error is approximately zero. The method further includes determining the extent to which the signal indicative of the phase current is symmetric about the midpoint of the time interval. Finally, in response to determining the extent to which the signal indicative of the phase current is symmetric, the method includes generating phase error information.

17 Claims, 4 Drawing Sheets

METHOD AND APPARATUS FOR CONTROLLING A MOTOR IN A MASS STORAGE DEVICE

BACKGROUND OF THE INVENTION

A mass storage device, such as a hard disk drive, utilizes a spindle motor to rotate platters that store information. The spindle motor generally rotates the platters at a constant angular speed while electromagnetic heads read from or write to circular tracks on the platters.

A three-phase spindle motor may include a magnetic rotor and three electric coils. The three electric coils are associated with the three phases of the motor. A separate current, called a phase current, flows through each of the three electric coils of the motor. The rotor rotates in response to an electrical field created by the phase currents.

The phase currents flowing through the three electric coils may interact with the magnetic elements in the motor to produce acoustic noise. In some motors, each electric coil cycles through three states: each electric coil can be held at ground, driven to some positive voltage, or floated. As a result, the phase currents flowing through the three electric coils have very abrupt transitions. Because torque is proportional to current, the abrupt changes in the phase currents cause the torque also to change abruptly. If the harmonics in the torque waveform excite mechanical resonances, the motor structure may vibrate and generate audible noise, which is not desirable.

To reduce the harmonics of the torque waveform, the motor can be driven with sinusoidal phase currents. Driving voltages can be applied to the electric coils of the motor to generate sinusoidal phase currents through the electric coils. However, in order to effectively operate the motor, each phase current should be aligned in phase with its corresponding back electromotive force. When each phase current is properly aligned with its corresponding back electromotive force, the motor produces maximum torque. Given a method of detecting phase error, a phase-locked loop can utilize current feedback to adjust the motor's commutation to achieve the proper alignment.

In some systems, a phase detect circuitry can recover the back electromotive force waveform from the undriven electric coil and then generate a signal proportional to the phase error. However, in a spindle motor driven with sinusoidal currents, the electric coils are constantly driven, so a phase detect circuitry cannot directly measure the back electromotive force to generate a signal indicative of phase error.

SUMMARY OF THE INVENTION

Accordingly, a need has arisen for an improved method and apparatus for controlling a motor in a mass storage device. The present invention provides a method and apparatus for controlling a motor in a mass storage device that address the shortcomings of prior systems and methods.

According to one embodiment of the invention, a method of detecting phase error between a phase current and a driving voltage includes generating a signal indicative of the phase current. The method includes identifying a time interval during which the signal indicative of the phase current is generally symmetric about a midpoint of the time interval when the phase error is approximately zero. The method further includes determining the extent to which the signal indicative of the phase current is symmetric about the midpoint of the time interval. Finally, in response to determining the extent to which the signal indicative of the phase current is symmetric, the method includes generating phase error information.

According to another embodiment of the invention, a hard disk drive system includes a disk storage media operable to store information and a spindle motor operable to rotate the disk storage media. Additionally, the hard disk drive system includes a motor driver operable to apply a driving voltage to an electric coil in the spindle motor and a sense resistor operable to receive a signal that includes a phase current flowing from the electric coil in the spindle motor. Finally, the system includes a phase detect circuit. The phase detect circuit can measure across the sense resistor a signal indicative of the phase current. The phase detect circuit can also identify a time interval during which the signal indicative of the phase current is generally symmetric about a midpoint of the time interval when the phase error is approximately zero. After identifying the time interval, the phase detect circuit can determine the extent to which the signal indicative of the phase current is symmetric about the midpoint of the time interval. Finally, the phase detect circuit can generate phase error information in response to determining the extent to which the signal indicative of the phase current is symmetric.

Embodiments of the invention provide numerous technical advantages. For example, one embodiment of the invention utilizes a sense resistor to provide a reliable resistance through which the phase currents of a motor can be measured. Phase detect circuitry examines the current flowing through the sense resistor during a specific time interval when the current is predominantly comprised of one phase current from one electric coil. The phase detect circuitry analyzes the current's symmetry about a midpoint within that time interval and, in response, generates phase error information regarding the alignment of the phase current and the driving voltage. With the phase error information, a phase-locked loop may utilize current feedback to properly adjust the motor's commutation. The phase-locked loop may align the phase current with a particular point of the driving voltage such that the phase current is aligned with the back electromotive force. When the phase currents are properly aligned with the back electromotive forces, the motor delivers a maximum torque.

A person skilled in the art can readily recognize other technical advantages from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

The present invention and its advantages are best understood by referring to FIGS. 1 through 7 of the drawings, like numerals being used for like and corresponding parts of the various drawings.

Figure 1:
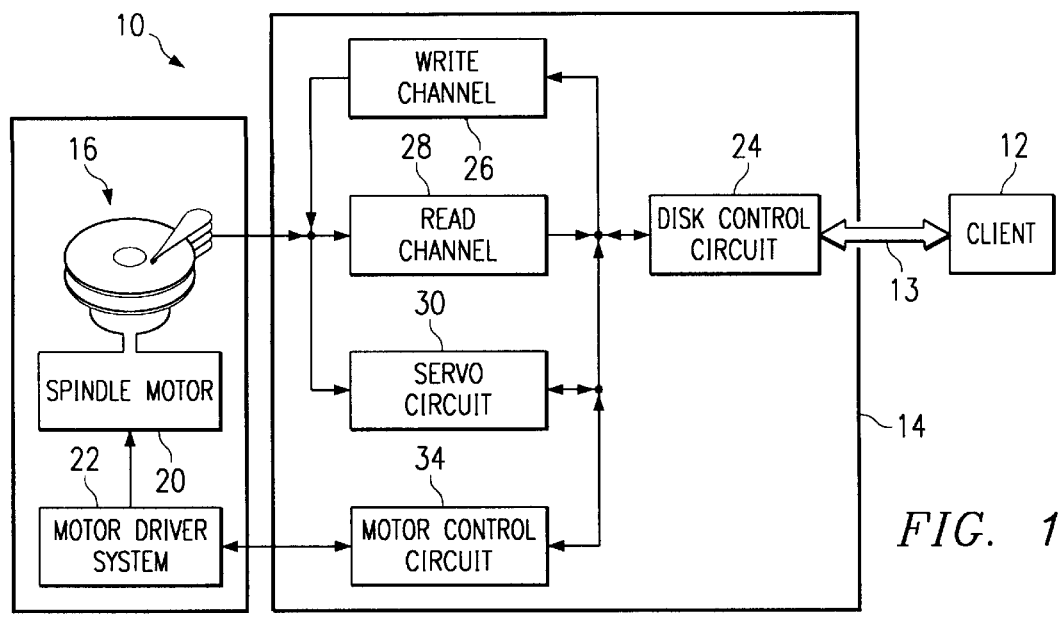
FIG. 1 is a block diagram of a hard disk drive system, according to the teachings of the present invention.

FIG. 1 is a block diagram of a hard disk drive system 10, according to the teachings of the present invention. Hard disk drive system 10 stores data during write operations and retrieves data during read operations. Hard disk drive system 10 includes hard disk drive integrated circuit 14, disk/head assembly 16, spindle motor 20, and motor driver system 22.

Hard disk drive system 10 interfaces and exchanges data with a client 12 through bus 13. Hard disk drive system 10 receives data from client 12 and stores that data to disk/head assembly 16. Later, hard disk drive system 10 can retrieve the data from disk/head assembly 16 and provide that data back to client 12. Disk/head assembly 16 includes a number of rotating, magnetic platters. Electromagnetic heads store data to and retrieve data from circular tracks on the platters. A preamplifier (not explicitly shown) may be used to amplify the data signals as needed.

Spindle motor 20 rotates the platters in disk/head assembly 16 at a constant angular speed while the electromagnetic heads read from or write to the circular tracks on the platters. Motor 20 may include a magnetic rotor that rotates in response to an electrical field created by phase currents flowing through each of three electric coils.

Hard disk drive integrated circuit 14 processes the digital data exchanged between client 12 and disk/head assembly 16. Hard disk drive integrated circuit 14 includes disk control circuit 24, write channel 26, read channel 28, servo circuit 30, and motor control circuit 34.

Write channel 26 processes any data that is to be stored to disk/head assembly 16. During write operations, write channel 26 receives a digital data signal from disk control circuit 24. Write channel 26 reformats and codes the digital data signal for storage and provides an analog data signal to disk/head assembly 16.

Read channel 28 processes any data that is retrieved from disk/head assembly 16. During read operations, read channel 28 receives an analog data signal from disk/head assembly 16. Read channel 28 decodes and formats the analog data signal and provides a digital data signal to disk control circuit 24.

Servo circuit 30 provides position error signals associated with positioning a head in disk/head assembly 16 to disk control circuit 24 during read and write operations. Servo circuit 30 receives a servo wedge signal from disk/head assembly 16. The servo wedge signal includes position error information. Servo circuit 20 processes this information and generates a servo output signal, which is received by disk control circuit 24.

Disk control circuit 24 controls the various operations of hard disk drive system 10. Disk control circuit 24 receives data from client 12 through bus 13 and transmits a corresponding digital data signal to write channel 26. Disk control circuit 24 receives a digital data signal from read channel 28 and provides corresponding data to client 12 through bus 13. Disk control circuit 24 also receives position error information from servo circuit 30 in the form of a servo output signal. In response, disk control circuit 24 sends a motor control input signal to motor control circuit 34.

Motor control circuit 34 comprises circuitry to properly interface with motor driver system 22 to control spindle motor 20. Motor control circuit 34 receives a motor control input signal from disk control circuit 24. Motor control circuit 34 processes the signal and sends a corresponding control signal to motor driver system 22.

Figure 2:
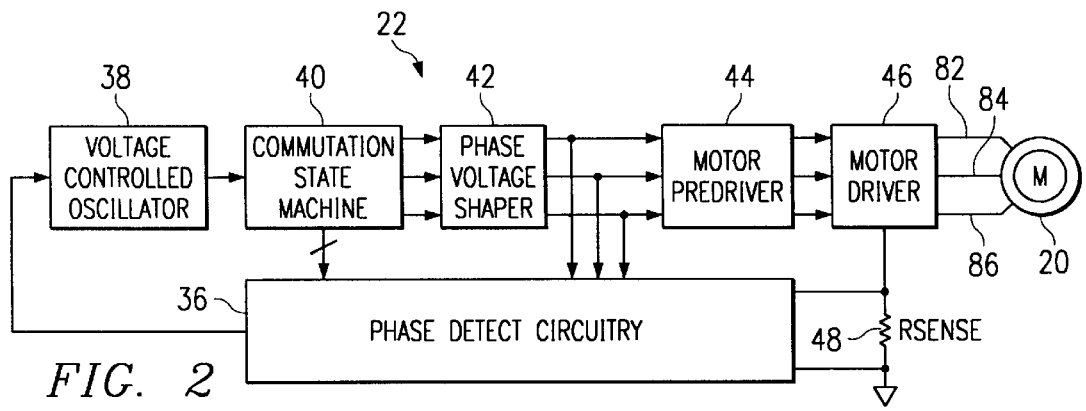
FIG. 2 is a block diagram of a motor driver system of the hard disk drive system illustrated in FIG. 1.

FIG. 2 is a block diagram of motor driver system 22, illustrated in FIG. 1. In the illustrated embodiment, motor driver system 22 includes motor driver 46, sense resistor 48, motor predriver 44, phase voltage shaper 42, commutation state machine 40, voltage controlled oscillator 38, and phase-detect circuitry 36.

Phase voltage shaper 42 generates three output signals, which may be pulse-width modulated. These signals drive motor predriver 44. Motor predriver 44 in turn produces three corresponding signals that drive motor driver 46. Sense resistor 48 is coupled to motor driver 46 and to ground. Motor driver 46 maintains a voltage signal across sense resistor 48. Phase-detect circuitry 36 processes the voltage signal across sense resistor 48 to generate phase error information. The phase error information relates to the alignment of a low peak of a phase current with a defined point of its corresponding driving voltage. An output signal of phase-detect circuitry 36 drives voltage controlled oscillator 38. In response to the phase error information received from phase detect circuitry 36, voltage controlled oscillator 38 adjusts the frequency of a clock signal that it provides to commutation state machine 44. Commutation state machine 40 is coupled to phase voltage shaper 42 and appropriately speeds up or slows down the driving voltages applied to the electric coils of the motor, thus completing the phase-locked loop. The phase-locked loop adjusts the commutation of motor 20 to align the low peaks of each phase current with a defined point of a corresponding driving voltage. The point of the driving voltage may be defined such that, when the low peak of a phase current is aligned with the defined point, the phase current is properly aligned with its corresponding back electromotive force. Thus, when the low peak of the phase current is aligned with the defined point, motor 20 produces a maximum torque.

Figure 3:
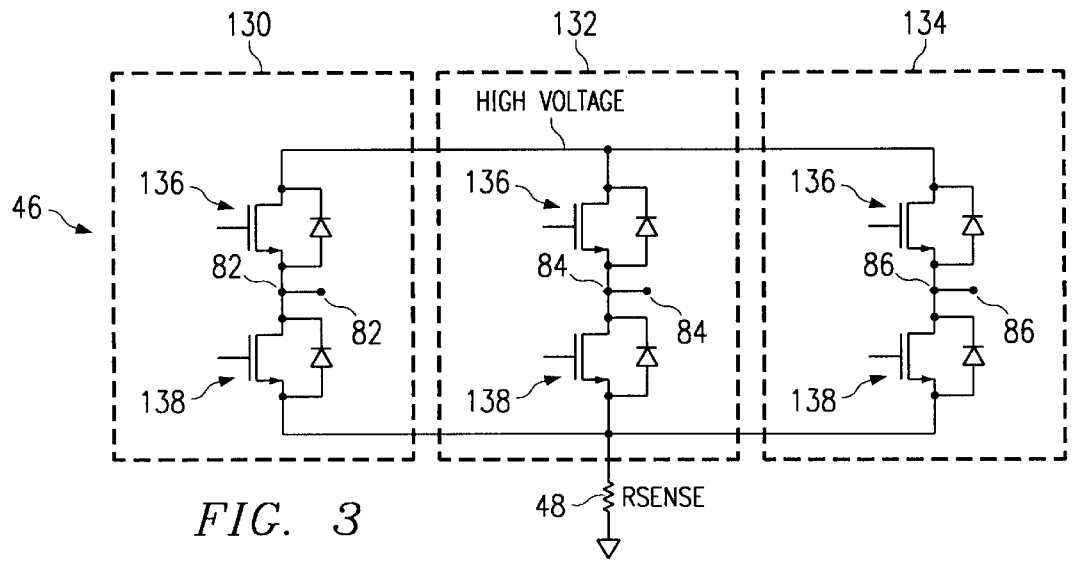
FIG. 3 is a schematic diagram of a motor driver of the motor driver system illustrated in FIG. 2.

FIG. 3 is a block diagram showing additional details of motor driver 46. Motor driver 46 drives motor 20. Motor driver 46 may include three, half H-bridge, power drivers 130, 132, and 134. Each of the power drivers 130, 132, and 134 may be constructed of a high-side driver 136 and a low-side driver 138 connected in series between a high voltage and sense resistor 48. Each of the high-side drivers 136 and low-side drivers 138 may comprise a field-effect transistor, having a source, a gate, and a drain. Output lead 82 is located between high-side driver 136 and low-side driver 138 of power driver 130. Output lead 84 is located between high-side driver 136 and low-side driver 138 of power driver 132. Output lead 86 is located between high-side driver 136 and low-side driver 138 of power driver 134. Output leads 82, 84, and 86 correspond to the three phases of motor 20, and each of output leads 82, 84, and 86 is coupled to a separate one of the three electric coils in motor 20.

Sense resistor 48 is located between motor driver 46 and ground. Within motor driver 46, sense resistor 48 is connected, in the illustrated embodiment, to the source of each low-side driver 138 of power drivers 130, 132, and 134. Sense resistor 48 may be used during the motor start-up routine to regulate the amount of current that flows through motor 20. Additionally, according to the teachings of the present invention, sense resistor 48 is utilized to provide a dependable resistance through which the phase currents of motor 20 can be measured.

Figure 4:
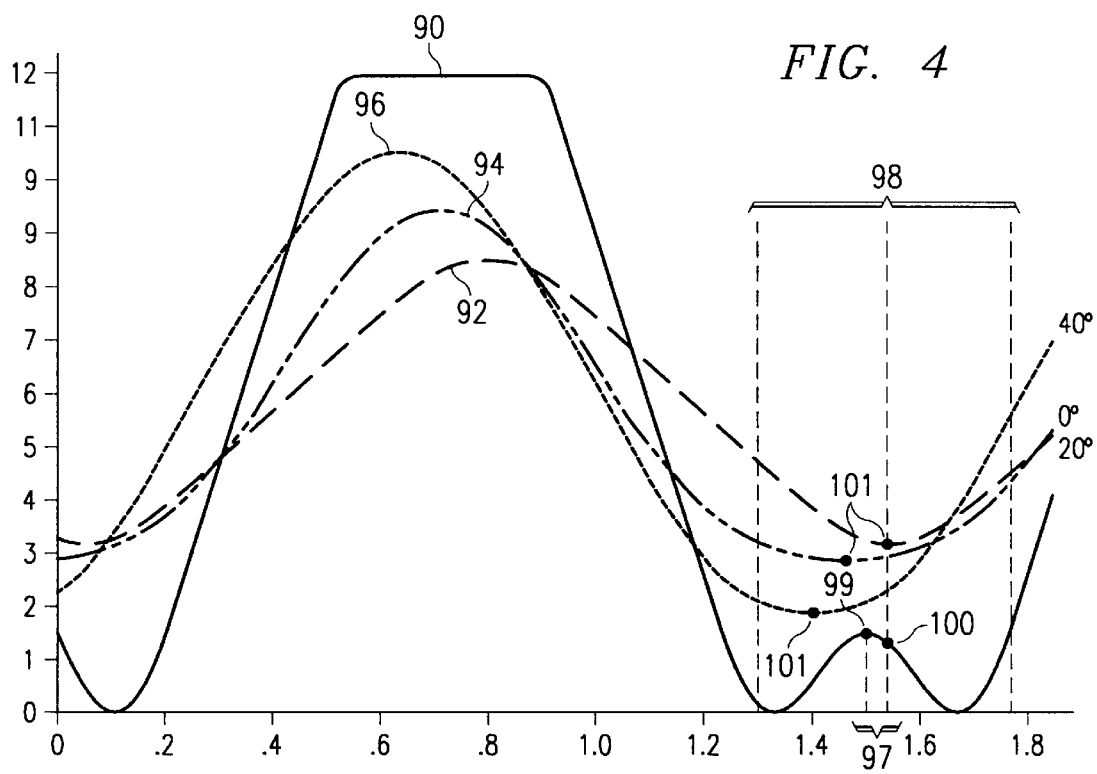
FIG. 4 is a graph over time of a driving voltage and a number of corresponding phase currents with different phase errors.
Figure 5:
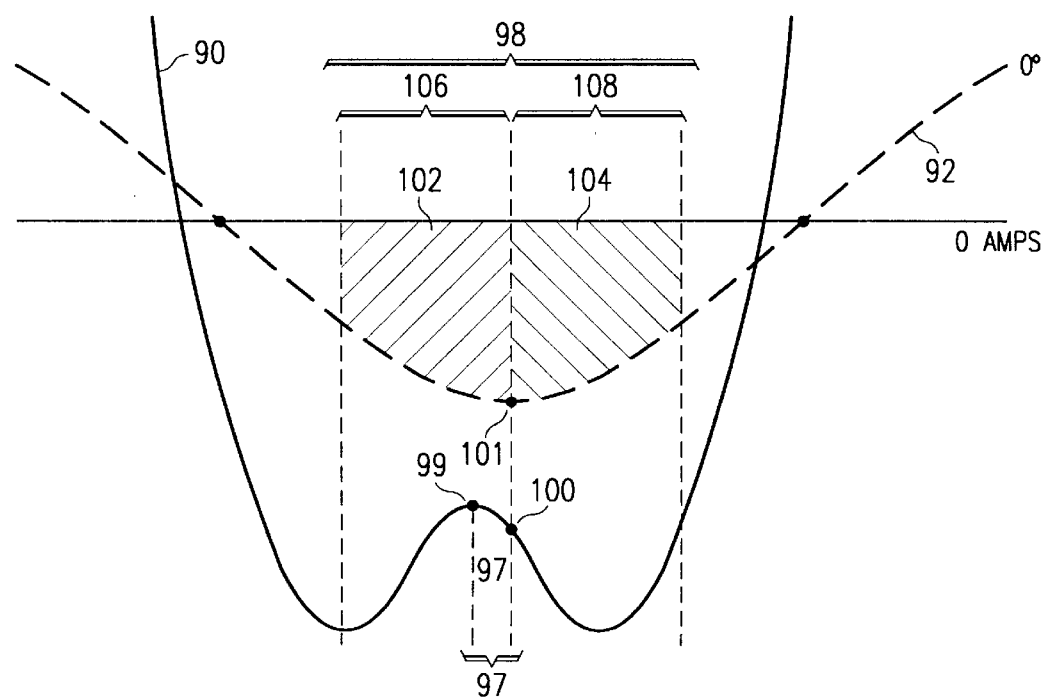
FIG. 5 is a graph of the driving voltage and one of the phase currents of FIG. 3, showing the symmetry of the phase current within an observation window defined with respect to the driving voltage.

Phase-detect circuitry 36 observes a phase current through sense resistor 48 during specific time intervals when the current flowing through sense resistor 48 is predominantly from one coil of motor 20. The current flowing through sense resistor 48 comprises the three phase currents from the three electric coils of motor 20. During specific time intervals of the driving cycle, one driving voltage is high and the other two driving voltages are low. During these time intervals, the current flowing through sense resistor 48 comprises predominantly the phase current from the one electric coil to which the high driving voltages is applied. Thus, during these time intervals, the phase-detect circuitry 36 can observe through sense resistor 48 the phase current flowing from one electric coil of motor 20. This time interval is referred to herein as an observable time interval. Because the phase currents peak during an observable time interval, phase-detect circuitry 36 relies on a peak-detection strategy to obtain phase error information relating to the alignment of the phase currents with their corresponding driving voltages. FIGS. 4 and 5 illustrate the peak-detection strategy utilized by phase-detect circuitry 36.

FIG. 4 is a graph over time of a voltage driving one of the three electric coils of motor 20 and a number of possible phase currents flowing through the same electric coil of motor 20. A midpoint 100 of an observation window 98 represents the point of driving voltage 90 that should align with a low peak 101 of the corresponding phase current in order for motor 20 to produce maximum torque. Midpoint 100 of observation window 98 will generally lag behind midpoint 99 of driving voltage 90 by a phase offset 97. The amount of phase offset 97 will depend on the resistance and inductance of motor 20. Phase currents 92, 94, and 96 each has a different phase error. Phase current 96 has a forty degree phase error because low peak 101 of phase current 96 is forty degrees ahead of midpoint 100 of observation window 98. Phase current 94 has a twenty degree phase error because low peak 101 of phase current 94 is twenty degrees ahead of midpoint 100 of observation window 98. Phase current 92 has a zero degree phase error because low peak 101 phase current 92 is aligned in phase with midpoint 100 of observation window 98. As illustrated in FIG. 5, low peak 101 of phase current 92 is aligned with midpoint 100 of observation window 98 when phase current 92 is symmetric about midpoint 100 in observation window 98.

FIG. 5 is a graph of driving voltage 90 and phase current 92 of FIG. 4. Phase detection circuitry 36 generates phase error information by measuring the symmetry of phase current 92 about midpoint 100 within observation window 98. If phase current 92 is symmetric about midpoint 100 within observation window 98, then low peak 101 of phase current 92 is aligned with midpoint 100 of observation window 98. If phase current 92 is asymmetric about midpoint 100 within observation window 98, then phase current 92 is not aligned with midpoint 100 of observation window 98, and the degree of asymmetry is related to the phase error. Because observation window 98 falls within a specific time interval during which the current flowing through sense resistor 48 is predominantly from one of the three electric coils of motor 20, phase-detect circuitry 36 can measure a phase current's symmetry by processing the voltage across sense resistor 48.

In the illustrated embodiment, phase detect circuitry 36 implements one method of determining whether phase current 92 is symmetric about midpoint 100 within observation window 98. This method involves comparing an area 102 within a first half 106 of observation window 98 with an area 104 within a second half 108 of observation window 98. If area 102 equals area 104, then phase current 92 is symmetric and centered within observation window 98, and thus, the low peak 101 of phase current 92 is aligned with midpoint 100 of observation window 98 If area 102 is greater than area 104, then low peak 101 of phase current 92 leads midpoint 100 of observation window 98. If area 102 is less than area 104, then low peak 101 of phase current 92 lags midpoint 100 of observation window 98. Because area 102 within first half 106 of observation window 98 equals area 104 within second half 108 of observation window 98, phase current 92 is symmetric about midpoint 100 within observation window 98, and, as illustrated in FIG. 4, low peak 101 of phase current 92 is aligned in phase with midpoint 100 of window 98. As a result, phase current 92 is aligned with driving voltage 90 with a constant phase difference 97.

Figure 6:
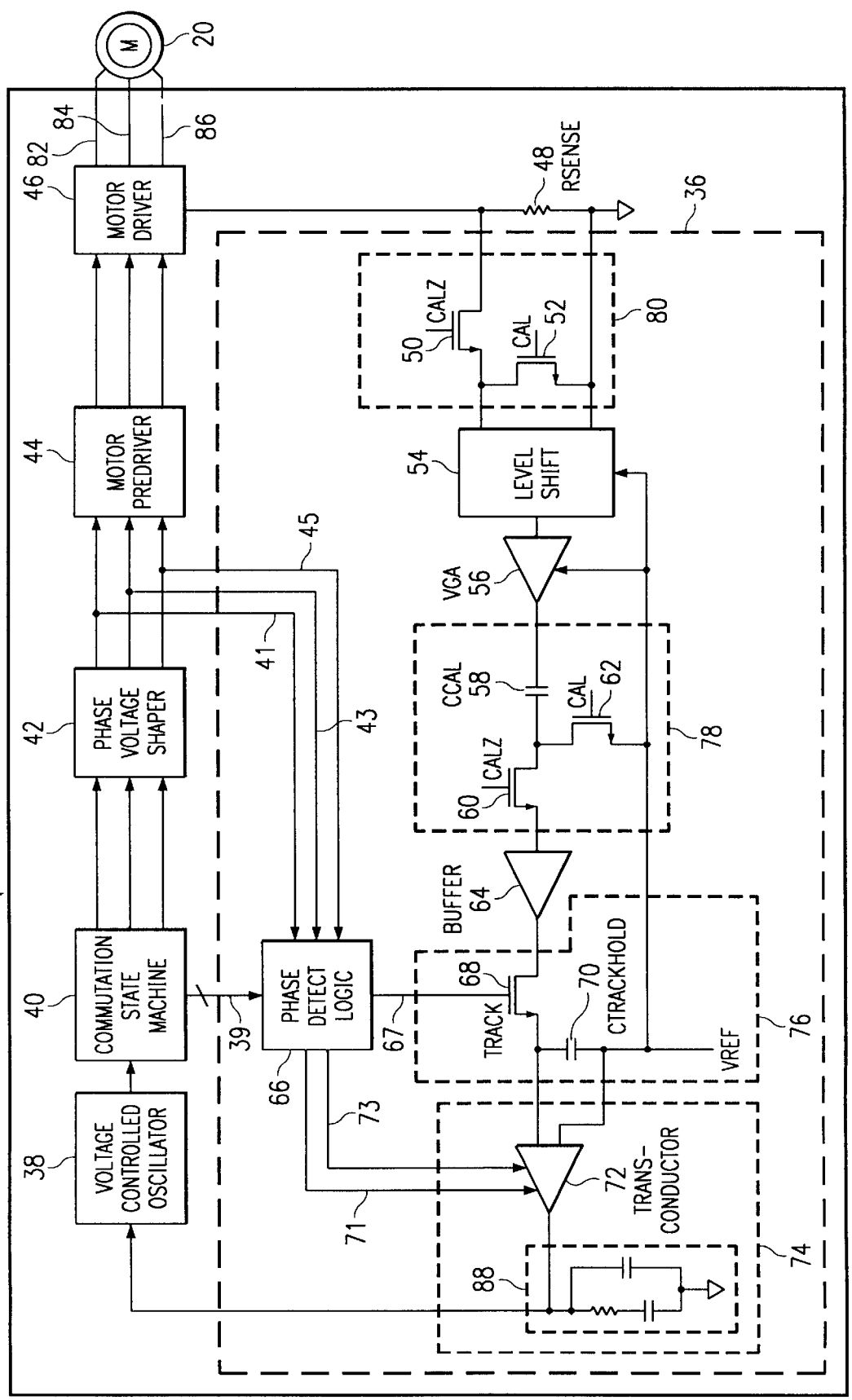
FIG. 6 is a block diagram of the motor driver system of FIG. 2, showing additional details of one embodiment of the phase detect circuitry.

FIG. 6 is a block diagram showing additional details of one embodiment of phase detect circuitry 36. In operation, phase-detect circuitry 36 processes the voltage signal present across sense resistor 48 to generate phase error information. Using this phase error information, motor driver system 22 can adjust the commutation of motor 20 to align the driving voltages with their corresponding phase currents. In the illustrated embodiment, phase-detect circuitry 36 comprises calibration circuit 80, level shift 54, variable gain amplifier 56, calibration circuit 78, buffer 64, track-and-hold circuit 76, and charge pump circuit 74.

Calibration circuit 80 and calibration circuit 78 are used to calibrate phase-detect circuitry 36 during calibration cycles. Calibration circuit 80 includes switches 50 and 52. Similarly, calibration circuit 78 includes switches 60 and 62. Switches 50, 52, 60, and 62 may be implemented with MOSFETs. Digital signals may drive each of switches 50, 52, 60, and 62.

Level shift 54 shifts the level of the voltage across sense resistor 48, and variable gain amplifier 56 amplifies the level-shifted voltage. The variable gain of variable gain amplifier 56 may be digitally programmable. The optimal gain is determined by the magnitude of the motor current.

Phase detect logic 66 receives signals 39 from commutation state machine 40 and signals 41, 43, and 45 from phase voltage shaper 42. Signals 39, 41, 43, and 45 relate to the driving voltages. Because observation window 98 and midpoint 100 are defined with respect to the driving voltages, phase detect logic 66 can utilize signals 39, 41, 43, and 45 to determine whether motor driver 46 is in a state where a phase current is observable within observation window 98. If motor driver 46 is in a state where a phase current is observable within observation window 98, then phase-detect logic 66 drives signal 67 high. If motor driver 46 is in a state where a phase current is not observable within observation window 98, then phase-detect logic 66 holds signal 67 low. Phase detect logic 66 also utilizes signals 39, 41, 43, and 45 to locate observation window 98 within time. Phase-detect logic 66 holds signal 71 high during the time interval within observation window 98. Otherwise, phase detect logic 66 holds signal 71 low. During the time interval within first half 106 of observation window 98, phase-detect logic 66 drives signal 73 high. During the time interval within second half 108 of observation window 98, phase-detect logic 66 holds signal 73 low.

Buffer 64 following the variable gain amplifier 56 drives track-and-hold circuit 76. Track-and-hold circuit 76 recovers the current through sense resistor 48 during a specific time interval of the driving cycle when predominantly one phase current flows through sense resistor 48. If signal 67 is high, then motor driver 46 is in a state where a phase current is observable within observation window 98, and thus, switch 68 applies the level-shifted and amplified version of the sense resistor voltage to track-and-hold capacitor 70. If signal 67 is low, then motor driver 46 is in a state where a phase current is not observable within observation window 98, and thus, switch 68 does not apply the level-shifted and amplified version of the sense resistor voltage to track-and-hold capacitor 70. Rather, track-and hold capacitor 70 remains at its previous voltage just before signal 67 went low.

Charge pump circuit 74 drives voltage controlled oscillator 38. Transconductor 72 produces a current that is proportional to the voltage on track-and-hold capacitor 70 and then uses the current to charge lead-lag resistor-capacitor network 88. If signal 71 is high and signal 73 is high, then motor driver 46 is in a state where a phase current is within first half 106 of observation window 98, and transconductor 72 applies a negative current to lead-lag resistor capacitor network 88. If signal 71 is high and signal 73 is low, then motor driver 46 is in a state where a phase current is within second half 108 of observation window 98, and transconductor 72 applies a positive current to lead-lag resistor-capacitor network 88. If signal 71 is low, then motor driver 46 is in a state where a phase current is not within observation window 98, and transconductor 72 applies no current to lead-lag resistor-capacitor network 88.

Transconductor 72 functions essentially as an integrator that integrates phase current 92 within the first half 106 of observation window 98 with a negative polarity and that integrates phase current 92 within the second half 108 of observation window 98 with a positive polarity. If phase current 92 is symmetric about midpoint 100 within observation window 98, then transconductor 72 applies an equal amount of negative current and positive current to lead-lag, resistor-capacitor network 88, and thus, lead-lag, resistor-capacitor network 88 exhibits no net change in charge. If low peak 101 of phase current 92 leads midpoint 100 of observation window 98, then transconductor 72 applies more negative current than positive current to lead-lag, resistor-capacitor network 88, and lead-lag, resistor capacitor network 88 exhibits a net loss of charge. If low peak 101 of phase current 92 lags midpoint 100 of observation window 98, then transconductor 72 applies more positive current than negative current to lead-lag, resistor-capacitor network 88, and lead-lag, resistor capacitor network 88 exhibits a net gain in charge.

Using the charge from charge pump circuit 74, voltage controlled oscillator 38 provides a clock signal to the commutation state machine 44. Voltage controlled oscillator 38 changes the frequency of the clock signal in response to a change in the charge from lead-lag, resistor-capacitor network 88. If lead-lag, resistor-capacitor network 88 exhibits a net-loss of charge, then low peak 101 of phase current 92 leads midpoint 100 of observation window 98, and voltage controlled oscillator 38 accordingly decrease the frequency of its clock signal. In response to the decrease in frequency of the clock signal, commutation state machine 44 adjusts its digital output signals to slow down the driving voltages generated by phase voltage shaper 43. If lead-lag, resistor-capacitor network 88 exhibits a net gain in charge, then low peak 101 of phase current 92 lags midpoint 100 of observation window 98, and voltage controlled oscillator 38 accordingly increases its clock frequency. In response to the increase in frequency of the clock signal, commutation state machine 44 adjusts its digital output signals to speed up the driving voltages generated by phase voltage shaper 43. The feedback loop from sense resistor 48 to phase voltage shaper 42 constitutes a phase-locked loop. The operation of phase detect circuitry 36 is described below in conjunction with FIG. 7.

Figure 7:
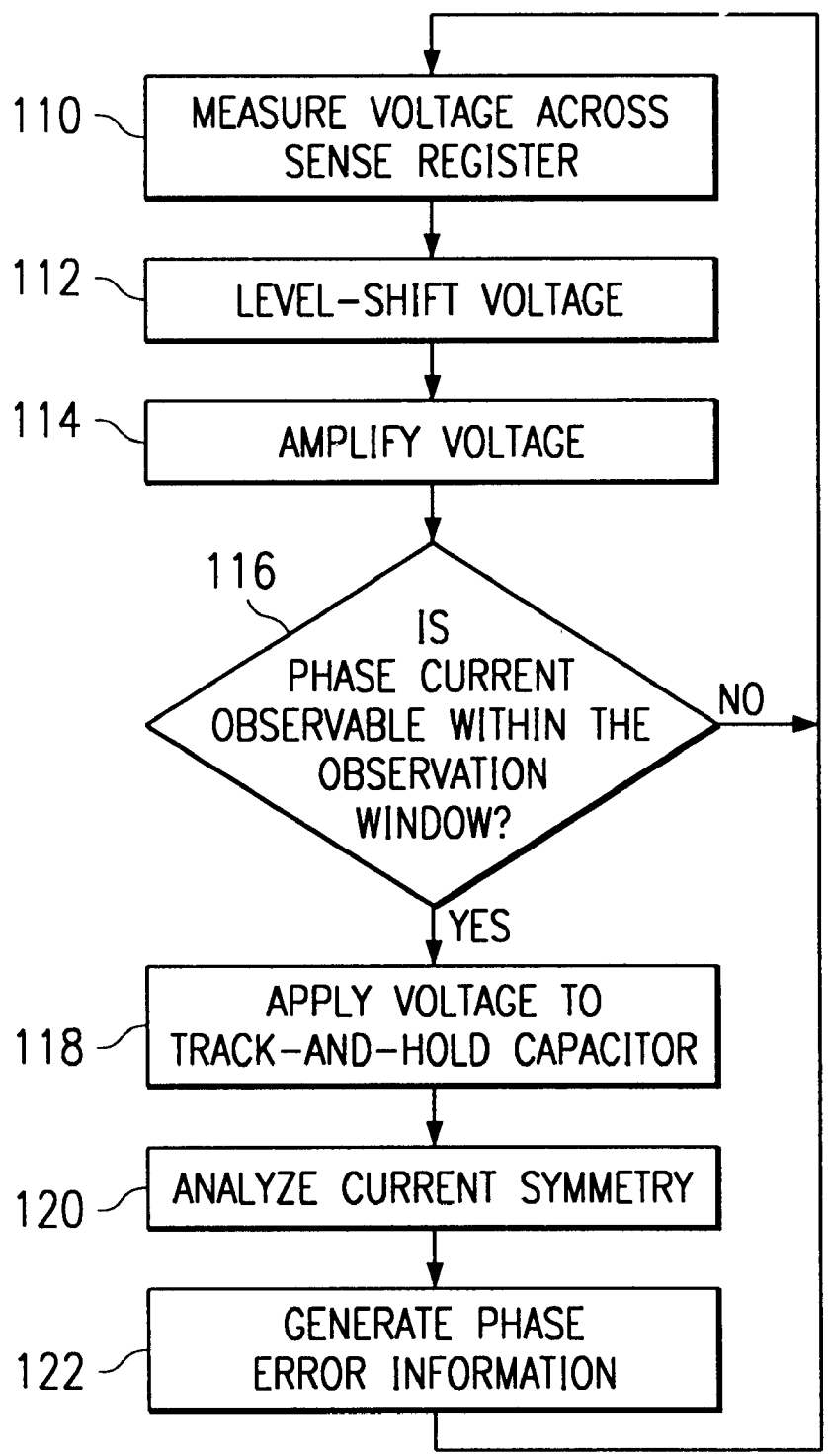
FIG. 7 is a flow chart illustrating a method of generating phase error information according to the teachings of the present invention.

FIG. 7 is a flow chart illustrating a method of generating phase error information according to the teachings of the present invention. At a step 110, phase-detect circuitry 36 measures the voltage across sense resistor 48. At a step 112, level shift 54 shifts the level of the voltage measured across sense resistor 48, and at step 114, variable gain amplifier 56 amplifies the shifted voltage to a desired amplitude.

At a step 116, phase-detect logic 66 determines whether a phase current 92 is observable within observation window 98. If motor driver 46 is in a state where a phase current 92 is observable within observation window 98, then phase-detect logic 66 holds signal 67 high, and switch 68 applies the level-shifted and amplified voltage to track-and-hold capacitor 70 in a step 118. If the motor driver enters a state where a phase current 92 is not observable within observation window 98, then phase-detect logic 66 holds signal 67 low, and track-and-hold capacitor 70 remains at its previous voltage just before signal 67 went low.

In a step 120, transconductor 72 produces a current proportional to the voltage on track-and-hold capacitor 70 and utilizes the current to sequentially charge down and charge up lead-lag, resistor-capacitor network 88. The charge in lead-lag, resistor-capacitor network 88 relates to the symmetry of the phase current 92 within observation window 98.

In a step 122, phase-detect circuitry 36 generates phase error information. The output charge of lead-lag, resistor-capacitor network 88 drives voltage controlled oscillator 38. Voltage controlled oscillator 38 adjusts the frequency of its output clock signal to align driving voltage 90 and phase current 92. This completes the phase-locked loop. Phase-detect circuitry 36 repeats these steps until the phase error between driving voltage 90 and phase current 92 is adjusted such that driving voltage 90 is properly aligned with its corresponding phase current 92 with a constant phase difference 99.

Although the present invention and its advantages are described in detail, a person skilled in the art could make various alterations, substitutions, and omissions without departing from the spirit and scope of the present invention as defined by the appended claims. For example, although the invention has been described in the context of a mass storage device, the teachings of the invention apply outside this context.

What is claimed is:

1. A method of detecting phase error between a phase current and a driving voltage to drive a motor, the method comprising:
   generating a signal indicative of the phase current;
   forming a time interval during which the signal indicative of the phase current is generally symmetric about a midpoint of the time interval when the phase error is approximately zero;
   measuring the symmetry of the signal indicative of the phase current about the midpoint of the time interval; and
   generating phase error information in response to determining the extent to which the signal indicative of the phase current is symmetric.

2. The method of claim 1, wherein generating a signal indicative of the phase current comprises measuring across a sense resistor a signal indicative of the phase current.

3. The method of claim 1, wherein generating a signal indicative of the phase current comprises providing the phase current as a signal indicative of the phase current.

4. The method of claim 1, wherein generating a signal indicative of the phase current comprises generating a generally sinusoidal signal.

5. The method of claim 2, wherein measuring across a sense resistor comprises measuring across a sense resistor that is connected between a motor driver and ground.

6. The method of claim 1, wherein determining the extent to which the signal indicative of the phase current is symmetric about the midpoint of the time interval further comprises integrating the signal to determine the extent to which the phase current is symmetric about the midpoint of the time interval.

7. The method of claim 1, wherein identifying a time interval further comprises identifying a point of the driving voltage that should align with a peak of the phase current when the phase error is approximately zero.

8. An apparatus for detecting phase error between a driving voltage of a motor and a phase current, the apparatus comprising:
   a sense resistor through which the phase current flows; and
   a phase-detect circuit operable to
      measure across the sense resistor a signal indicative of the phase current;
      measure a time interval during which the signal indicative of the phase current is generally symmetric about a midpoint of the time interval when the phase error is approximately zero;
      measure the symmetry of the signal indicative of the phase current about the midpoint of the time interval; and
      generate phase error information in response to determining the extent to which the signal indicative of the phase current is symmetric.

9. The apparatus of claim 8, wherein the signal indicative of the phase current comprises the phase current.

10. The apparatus of claim 8, wherein the phase current is sinusoidal.

11. The apparatus of claim 8, wherein the sense resistor is connected between a motor driver and ground.

12. The apparatus of claim 8, wherein the phase-detect circuit is further operable to identify a point of the driving voltage that should align with a peak of the phase current when the phase error is approximately zero.

13. A hard disk drive system comprising:
   a disk storage media operable to store information;
   a spindle motor operable to rotate the disk storage media;
   a motor driver operable to apply a driving voltage to an electric coil in the spindle motor;
   a sense resistor operable to receive a signal that includes a phase current flowing from the electric coil in the spindle motor; and
   a phase detect circuit operable to
      measure across the sense resistor a signal indicative of the phase current;
      measure a time interval during which the signal indicative of the phase current is generally symmetric about a midpoint of the time interval when the phase error is approximately zero;
      measure the symmetry of the signal indicative of the phase current about the midpoint of the time interval; and
      generate phase error information in response to determining the extent to which the signal indicative of the phase current is symmetric.

14. The hard disk drive system of claim 13, wherein the signal indicative of the phase current comprises the phase current.

15. The hard disk drive system of claim 13, wherein the phase current is sinusoidal.

16. The hard disk drive system of claim 13, wherein the sense resistor is connected between the motor driver and ground.

17. The hard disk drive system of claim 13, wherein the phase-detect circuit is further operable to identify a point of the driving voltage that should align with a peak of the phase current when the phase error is approximately zero.

* * * * *